United States Patent
Lin

(10) Patent No.: US 9,616,566 B2
(45) Date of Patent: Apr. 11, 2017

(54) ROBOTIC HAND, METHOD FOR MAKING THE SAME, AND ROBOT HAVING THE SAME

(71) Applicant: HON HAI PRECISION INDUSTRY CO., LTD., New Taipei (TW)

(72) Inventor: Yi-Cheng Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/752,080

(22) Filed: Jun. 26, 2015

(65) Prior Publication Data

US 2016/0229053 A1  Aug. 11, 2016

(30) Foreign Application Priority Data

Feb. 6, 2015  (CN) .......................... 2015 1 0062717

(51) Int. Cl.
  *G05B 15/00* (2006.01)
  *G05B 19/00* (2006.01)
  *B25J 9/16* (2006.01)
  *B25J 13/08* (2006.01)

(52) U.S. Cl.
  CPC ........... *B25J 9/1612* (2013.01); *B25J 9/1697* (2013.01); *B25J 13/084* (2013.01); *Y10S 901/30* (2013.01); *Y10S 901/47* (2013.01)

(58) Field of Classification Search
  None
  See application file for complete search history.

(56) References Cited

U.S. PATENT DOCUMENTS

| 4,641,251 | A  | * | 2/1987 | Inoue | B25J 9/0081 180/8.6 |
| 4,654,949 | A  | * | 4/1987 | Pryor | A01B 69/008 29/407.04 |
| 5,744,728 | A  | * | 4/1998 | Suita | B25J 19/063 73/862.542 |
| 8,286,528 | B2 | * | 10/2012 | Fujioka | B25J 9/102 74/490.01 |
| 2008/0161970 | A1 | * | 7/2008 | Adachi | B25J 9/0003 700/253 |
| 2009/0055019 | A1 | * | 2/2009 | Stiehl | B25J 9/1671 700/249 |
| 2009/0173560 | A1 | * | 7/2009 | Nakamoto | B25J 5/00 180/167 |
| 2010/0139437 | A1 | * | 6/2010 | Ichikawa | B25J 9/1612 74/490.05 |
| 2010/0191372 | A1 | * | 7/2010 | Nihei | B25J 9/1676 700/245 |

* cited by examiner

*Primary Examiner* — Bhavesh V Amin
(74) *Attorney, Agent, or Firm* — Zhigang Ma

(57) ABSTRACT

A robotic hand includes an interior casing, a cladding layer wrapped around an end of the interior casing, a plurality of photoelectric sensors, and a controller. The photoelectric sensors are located at different locations on an exterior surface of the interior casing, and are wrapped by the cladding layer. The photoelectric sensors can sense light signals striking different locations on the exterior surface of the interior casing, and convert the sensed optical signals into electrical signals. The controller can obtain the generated electrical signals, determine a pressure value applied according to the obtained electric signals, and generate a control signal according to the determined pressure value causing the robot to generate feedback.

16 Claims, 7 Drawing Sheets

ROBOTIC HAND, METHOD FOR MAKING THE SAME, AND ROBOT HAVING THE SAME

This application is related to co-pending U.S. patent application entitled, "ROBOTIC HAND, METHOD FOR MAKING THE SAME, AND ROBOT HAVING THE SAME", filed Jun. 26, 2015. The application has the same assignee as the present application. The above-identified application is incorporated herein by reference.

FIELD

The subject matter herein generally relates to a robotic hand, a method for making the robotic hand, and a robot having the robotic hand.

BACKGROUND

Robots are increasingly being employed in tasks that are otherwise dangerous or tedious for humans. The ability of a robot can be increased when tactile sensors are incorporated into the robotic hands to enable the robot to "feel" objects in robotic hand and to generate corresponding feedback.

BRIEF DESCRIPTION OF THE DRAWINGS

Implementations of the present technology will now be described, by way of example only, with reference to the attached figures.

DETAILED DESCRIPTION

Figure 1:
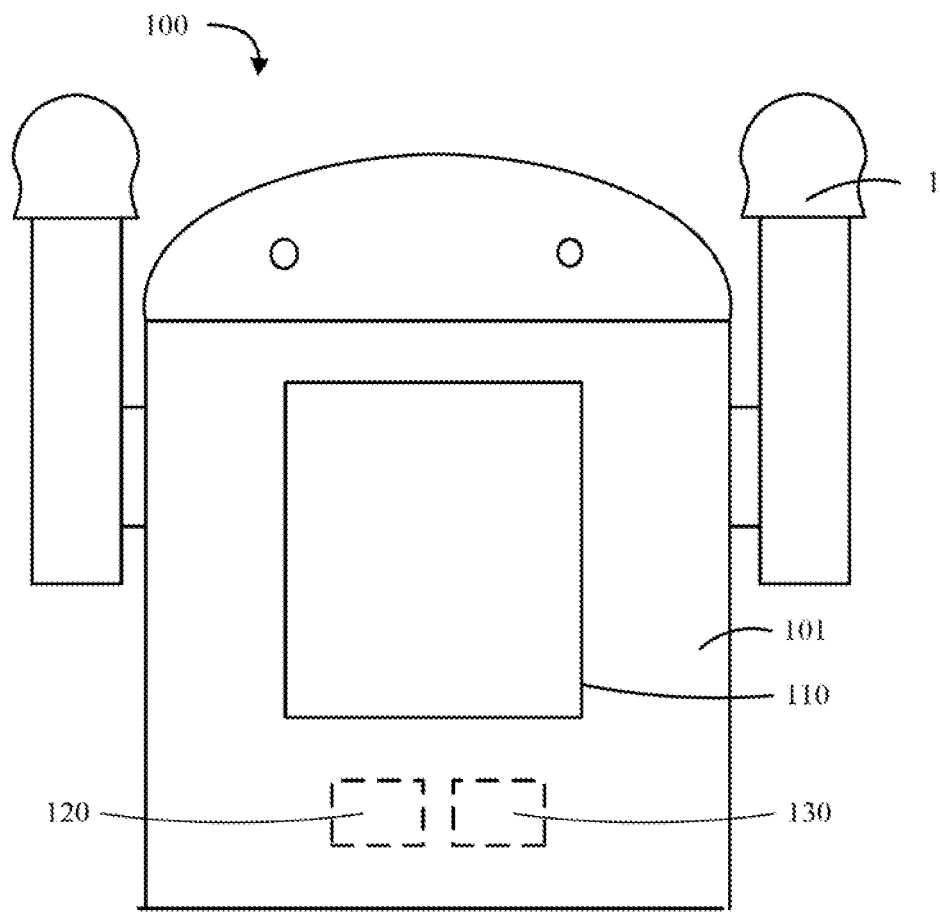
FIG. 1 is a diagrammatic view of an embodiment of a robot.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an embodiment of a robot 100 including a body 101 and two robotic hands 1 secured to two opposite sides of the body 101.

Figure 2:
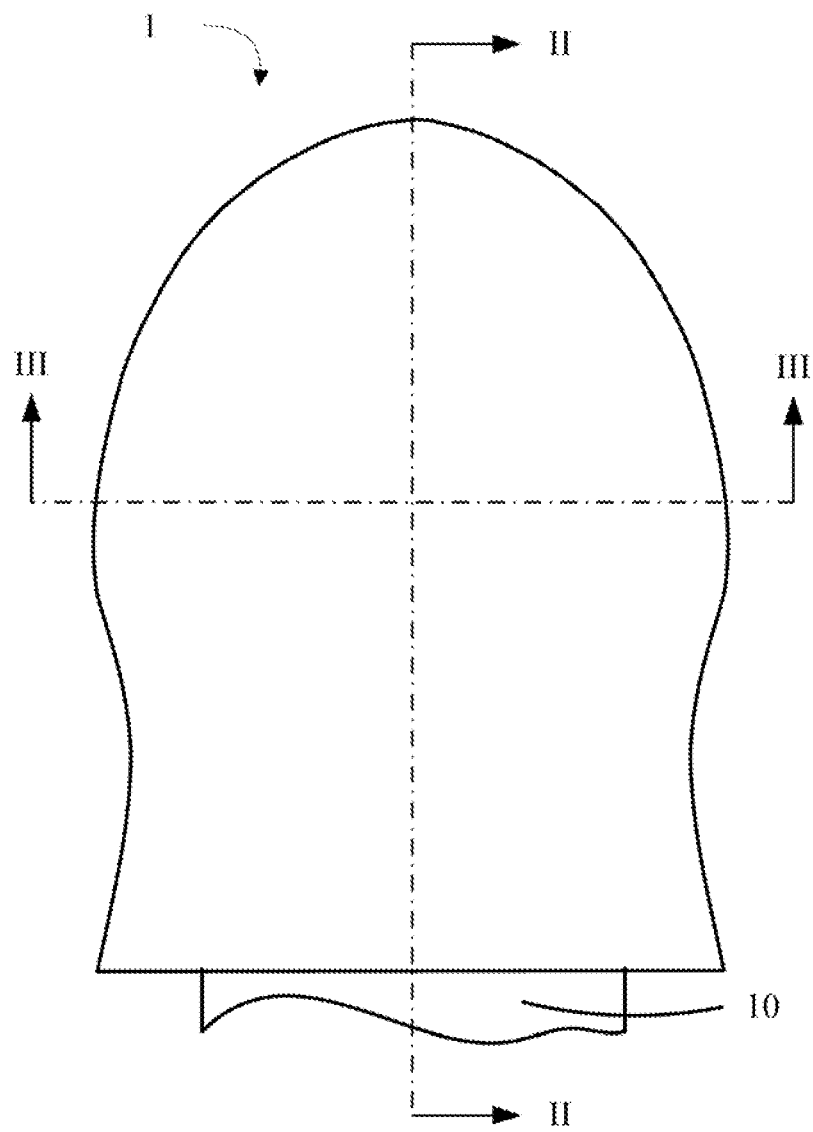
FIG. 2 is a sectional perspective view of a robotic hand included in the robot of FIG. 1.
Figure 3:
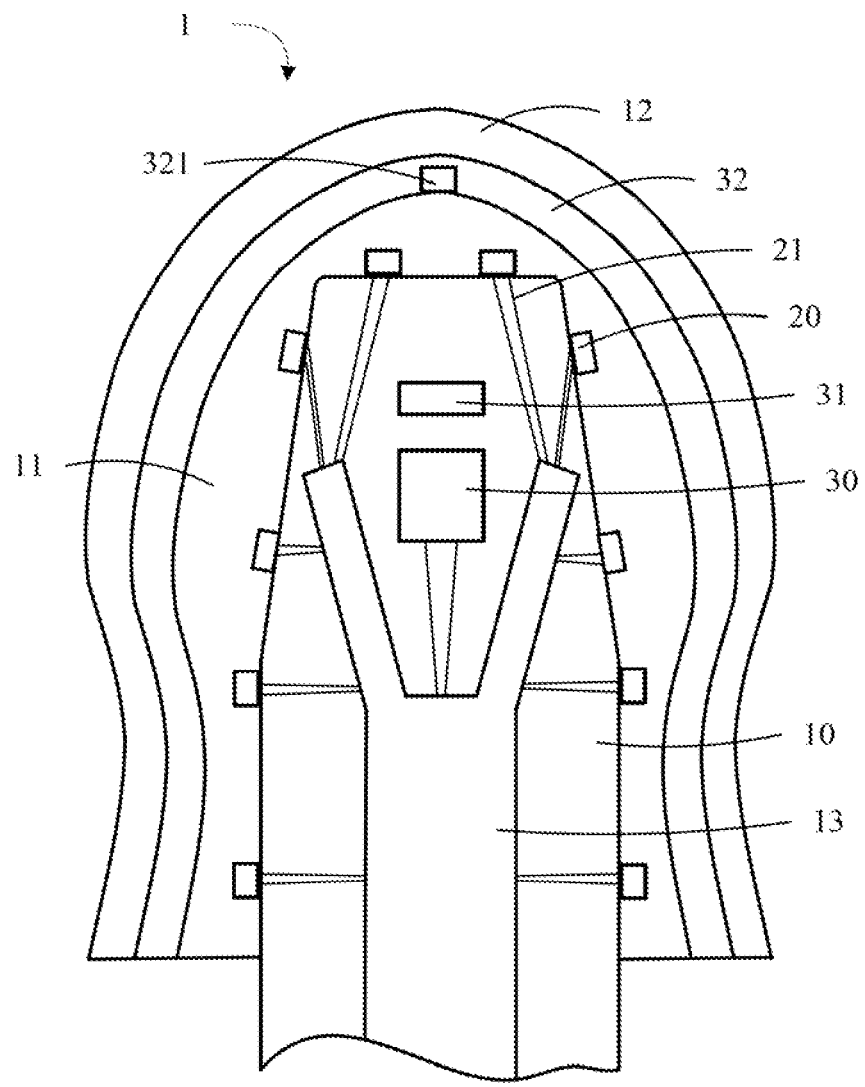
FIG. 3 is a cross-sectional view taken along line II-II of FIG. 2.
Figure 4:
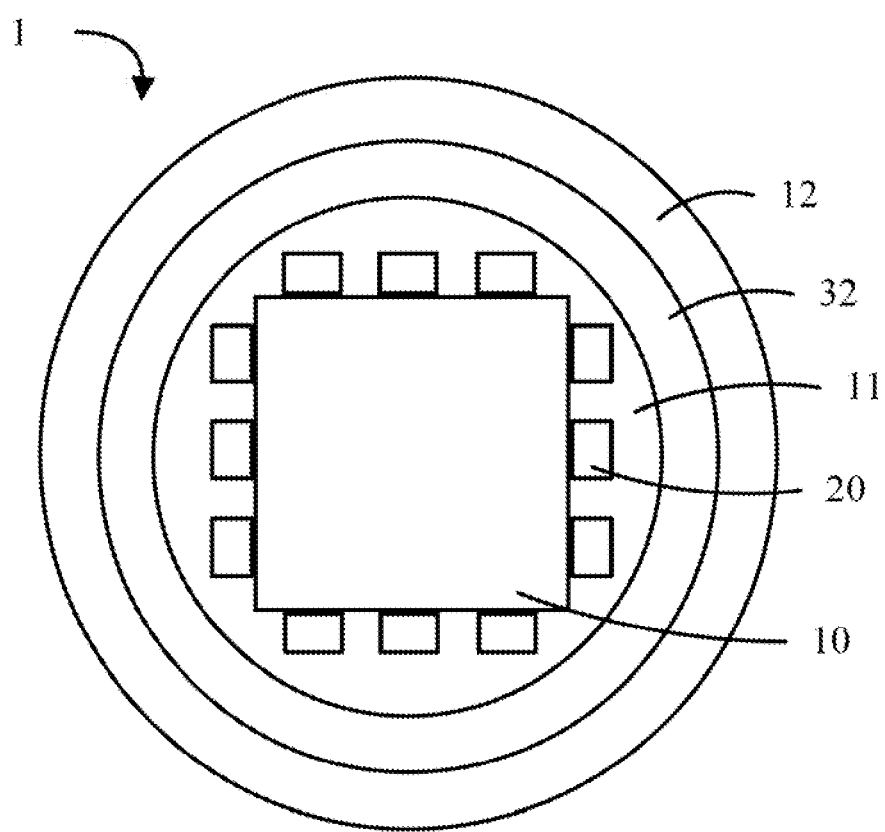
FIG. 4 is a cross-sectional view taken along line III-III of FIG. 2.
Figure 5:
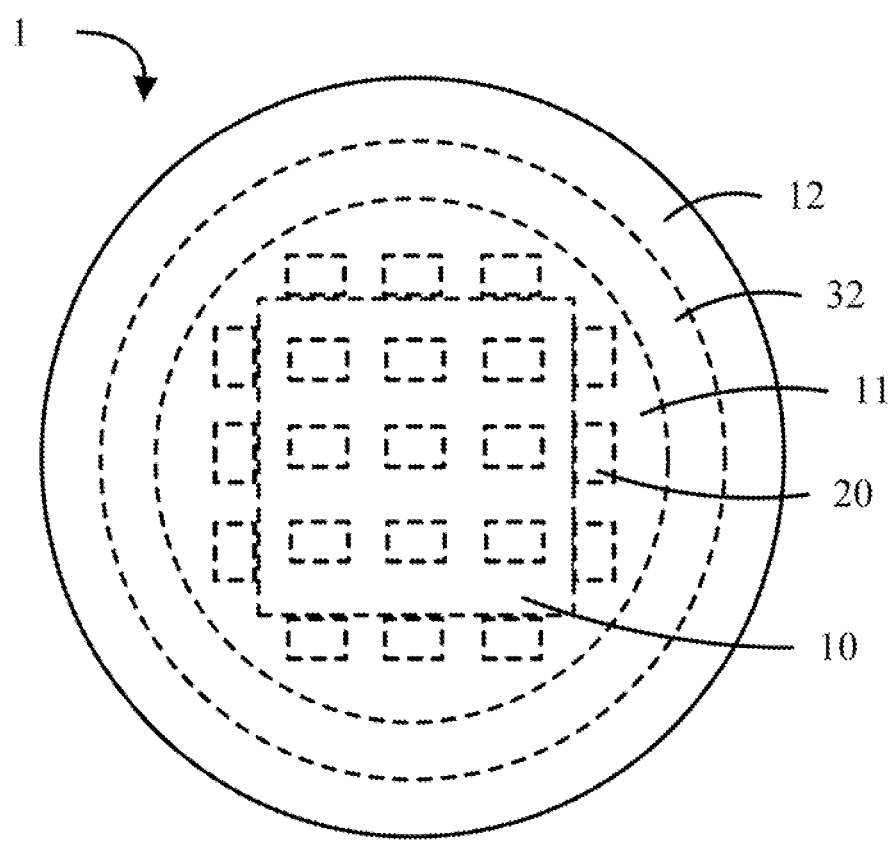
FIG. 5 is similar to FIG. 2, but showing the robotic hand from another angle.

FIG. 2 illustrates that each robotic hand 1 includes an interior casing 10. FIG. 3 illustrates that each robotic hand 1 further includes a cladding layer 11, a number of photoelectric sensors 20, and a controller 30. Also referring to FIGS. 4-5, the cladding layer 11 is wrapped around an exterior surface of an end of the interior casing 10, and is made of elastic resin such as rubber or polyurethane. The photoelectric sensors 20 are located at different locations on the exterior surface of the interior casing 10, and are wrapped by the cladding layer 11. When a pressure is applied to the robotic sensor 1, the cladding layer 11 is elastically deformed, causing light signals entering the cladding layer 11 to be diffused. As such, the light signals received by the photoelectric sensors 20 are different from the light signals received when no pressure is applied. The photoelectric sensors 20 sense light signals striking different locations on the exterior surface of the interior casing 10, and convert the sensed optical signals into electrical signals. The controller 30 is located inside the interior casing 10, and is electrically connected to each of the photoelectric sensors 20. The controller 30 obtains the electrical signals generated by the photoelectric sensors 20, determines a pressure value of the pressure applied according to the obtained electric signals, and generates a control signal according to the determined pressure value. The control signal is able to cause the robot 100 to generate feedback. In this embodiment, the elastic resin used to make the cladding layer 11 is transparent to allow the lights to enter.

Figure 6:
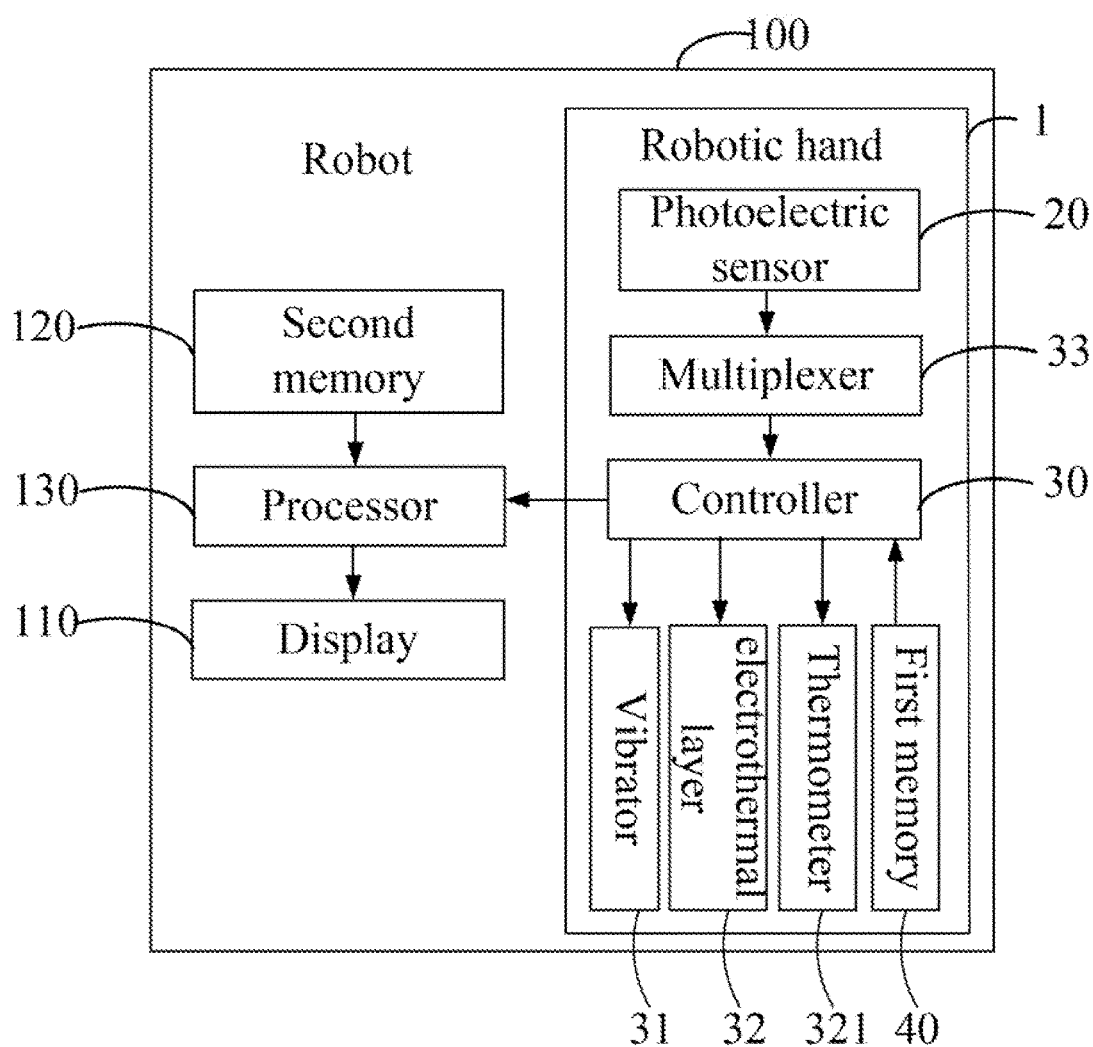
FIG. 6 is a block diagram of the robotic hand of FIG. 2.

FIG. 6 illustrates that each robotic hand 1 further includes a first memory 40 for storing different feedback data, and a first relationship between pressure values and the feedback data. Each feedback data corresponds to one pressure value. In at least one embodiment, the pressure value is proportional to the feedback data. That is, the greater the pressure value is, the greater the feedback data is (the stronger feedback is). The controller 30 determines feedback data corresponding to the determined pressure value according to the stored first relationship, and generates the control signal according to the determined feedback data, thereby controlling the robot 100 to generate feedback with the feedback data.

In at least one embodiment, the feedback generated by the robot 100 is vibration feedback. In this embodiment, the feedback data is a vibration data, such as amplitude or frequency of the vibration feedback. In detail, the robotic hand 1 further includes a vibrator 31 (shown in FIGS. 3 and 6) located in the interior casing 10 and electrically connected to the controller 30. The controller 30 determines a vibration data corresponding to the determined pressure value according to the stored first relationship, generates the control signal according to the determined vibration data. The control signal is able to cause the vibrator 31 to vibrate according to the determined vibration data, thereby allowing the robot 100 to generate the vibration feedback.

In another embodiment, the feedback generated by the robot 100 is temperature feedback. In this embodiment, the feedback data is a temperature value. In detail, the robotic hand 1 further includes an electrothermal layer 32 wrapping around an exterior surface of the cladding layer 11. The electrothermal layer 32 is made of electrothermal polymer such as polyimide. The controller 30 determines a temperature value corresponding to the determined pressure value according to the stored first relationship, generates the control signal according to the determined temperature value. The control signal is able to cause the electrothermal layer 32 to heat to the determined temperature value, thereby allowing the robot 100 to generate the temperature feedback. However, the controller 30 can also control the electrothermal layer 32 to heat according to an ambient temperature of an environment in which the robotic hand 1 is located, other than heating according to the pressure value applied to the robotic hand 1. In this embodiment, the robotic hand 1 further includes a thermometer 321 located in the electrothermal layer 32. The thermometer 321 senses an ambient temperature value of the environment. The controller 30 obtains the sensed ambient temperature value from the thermometer 321, compares the obtained ambient temperature value with a preset value, and generates the control signal when the obtained ambient temperature value is greater than the preset value. The control signal is able to cause the electrothermal layer 32 to heat, thereby allowing the robot 100 to generate the temperature feedback.

In yet another embodiment, the feedback generated by the robot 100 is based on emotion displayed in pictures. In this embodiment, the robot 100 further includes a display screen 110 (shown in FIGS. 1 and 6) secured to a front surface of the body 101, and a second memory 120 and a processor 130 (shown in FIGS. 1 and 6) located in the body 101. The second memory 120 stores a number of pictures having associated emotional classifications, and a second relationship between the pressure values and the pictures. Each picture corresponds to one pressure value. In at least one embodiment, the pressure value is greater, corresponding with the stronger emotion expressed by the corresponding picture. The processor 130 is electrically connected to the controller 30. The processor 130 obtains the pressure value from the controller 30, determines a picture corresponding to the obtained pressure value according to the stored second relationship, and controls the display screen 110 to display the determined picture, thereby allowing the robot 100 to generate feedback based on emotion displayed in pictures.

In yet another embodiment, the feedback generated by the robot 100 includes at least two of the vibration feedback, the temperature feedback, and the feedback based on emotion displayed in pictures. In this embodiment, the robotic hand 1 further includes a multiplexer 33 (shown in FIG. 6) located in the interior casing 10. The controller 30 is electrically connected to the photoelectric sensors 20 via the multiplexer 33. The multiplexer 33 includes a number of sub-channels (not shown) each connected to one photoelectric sensor 20. The multiplexer 33 scans the sub-channels to obtain the electrical signals from at least one photoelectric sensor 20 via the corresponding sub-channel. The controller 30 obtains the electrical signals from the multiplexer 33, and generates the control signal according to the obtained electrical signals. The control signal is able to cause the robot 100 to generate at least two of the vibration feedback, the temperature feedback, and the feedback based on emotion displayed in pictures.

In at least one embodiment, the interior casing 10 1 is polyhedral-shaped. The photoelectric sensors 20 are secured to different surfaces of the interior casing 10. The robotic hand 1 further includes a protective layer 12 wrapped around an exterior surface of the electrothermal layer 32. The protective layer 12 is made of elastic resin such as rubber. The interior casing 10 further defines a number of through holes (not shown) to allow wires 21 (shown in FIG. 3) connecting the controller 30 and the photoelectric sensors 20 to pass through. The robotic hand 1 further includes a positioning member 13 (shown in FIG. 3) located in the interior casing 10. The wires 21 of the photoelectric sensors 20 can pass through different locations of the positioning member 13 and are then connected to the controller 30, thereby preventing the wires 21 from being disorderly.

The photoelectric sensors 20 secured to each surface of the interior casing 10 can be arranged in a matrix. The number of the photoelectric sensors 20 can be varied. In at least one embodiment, the number of the photoelectric sensors 20 is nine. The photoelectric sensors 20 are arranged in a 3×3 matrix (shown in FIG. 4).

Figure 7:
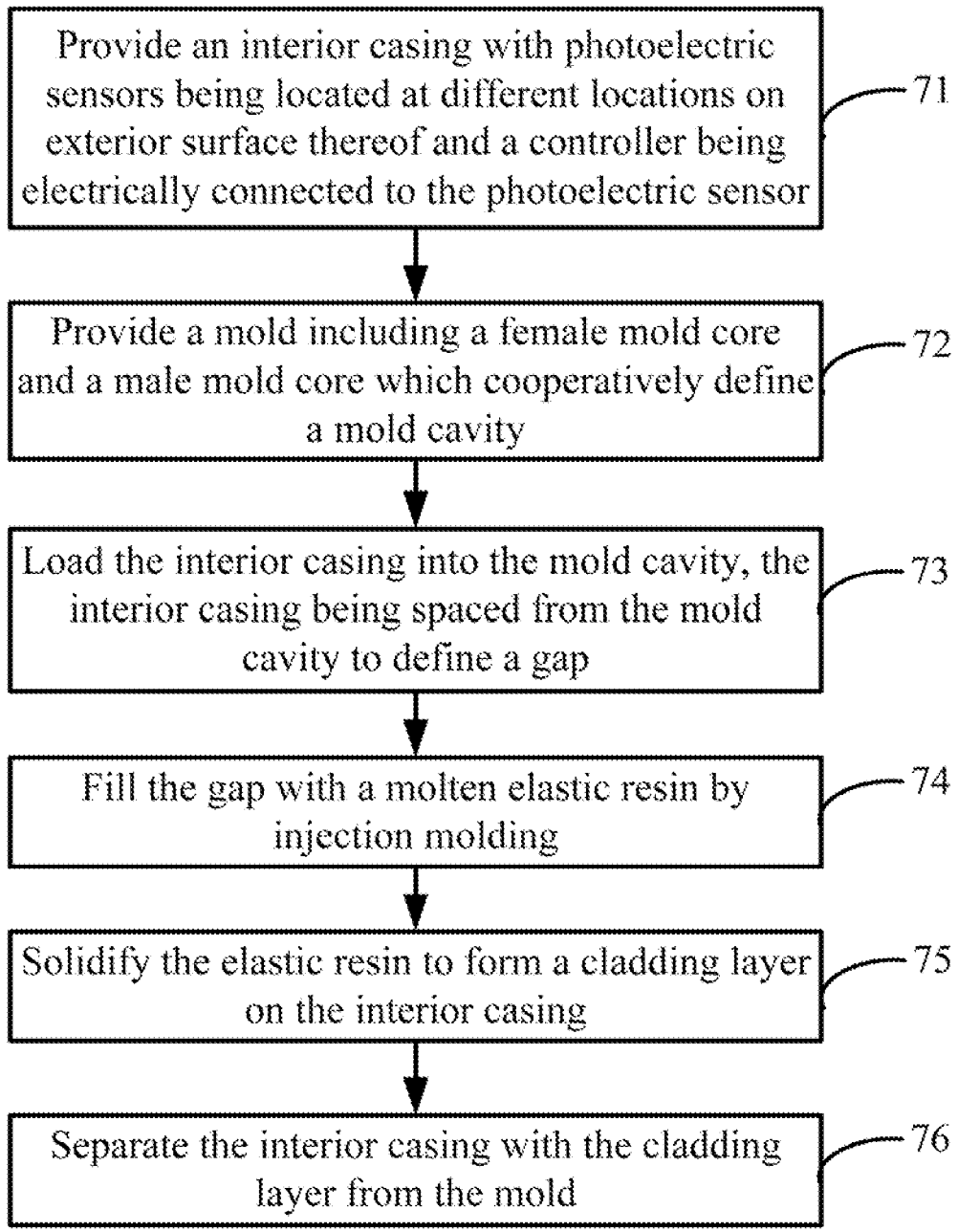
FIG. 7 is a flowchart of an embodiment of a method for making a robotic hand.

Referring to FIG. 7, a flowchart for making a robotic hand 1 is presented in accordance with an example embodiment which is being thus illustrated. The example method for making the robotic hand 1 is provided by way of example, as there are a variety of ways to carry out the method. The method described below can be carried out using the configurations illustrated in FIGS. 1-6, for example, and various elements of these figures are referenced in explaining the example method. Each block shown in FIG. 7 represents one or more processes, methods or subroutines, carried out in the exemplary method. Furthermore, the illustrated order of blocks is by example only and the order of the blocks can change according to the present disclosure. Additional blocks may be added or fewer blocks may be utilized, without departing from this disclosure. The exemplary method can begin at block 71.

At block 71, an interior casing 10 is provided. A number of photoelectric sensors 20 are located at different locations on the exterior surface of the interior casing 10. A controller 30 is located inside the interior casing 10, and is electrically connected to each of the photoelectric sensors 20. The photoelectric sensors 20 can sense light signals striking different locations on the exterior surface of the interior casing 10, and convert the sensed optical signals into electrical signals. The controller 30 can obtain the generated electrical signals, determine a pressure value of the pressure applied according to the obtained electric signals, and generate a control signal according to the determined pressure value. The control signal is able to cause the robot 100 to generate feedback.

At block 72, a mold (not shown) including a female mold core and a male mold core is provided. The female mold core and the male mold core cooperatively define a mold cavity.

At block 73, the interior casing 10 is loaded into the mold cavity, and is spaced from interior surfaces of the mold cavity to define a gap.

At block 74, the gap is filled with a molten elastic resin by injection molding. The elastic resin can be rubber or polyurethane.

At block 75, the elastic resin is solidified to form a cladding layer 11 on the exterior surface of the interior casing 10, causing the photoelectric sensors 20 to be wrapped by the cladding layer 11.

At block 76, the interior casing 10 with the cladding layer 11 is separated from the mold. Thus, the robotic hand 1 is obtained. In at least one embodiment, this can be further followed by wrapping an electrothermal layer 32 around an exterior surface of the cladding layer 11, and wrapping a protective layer 12 around an exterior surface of the electrothermal layer 32. The electrothermal layer 32 is made of electrothermal polymer such as polyimide. The protective layer 12 is made of elastic material such as rubber. The electrothermal layer 32 and the protective layer 12 can also be formed by injection molding.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A robotic hand comprising:
    an interior casing;
    a cladding layer wrapped around an exterior surface of an end of the interior casing, the cladding layer made of elastic resin;
    a plurality of photoelectric sensors located at different locations on the exterior surface of the interior casing, the plurality of photoelectric sensors wrapped by the cladding layer and configured to sense light signals striking the different locations on the exterior surface of the interior casing, and convert the sensed optical signals into electrical signals;
    a controller located inside the interior casing and electrically connected to each on of the plurality of photoelectric sensors, the controller configured to obtain the generated electrical signals, determine a pressure value of pressure applied according to the obtained electric signals, and generate a control signal according to the determined pressure value, the control signal causing a robot to generate feedback; and
    a first memory, wherein the first memory is configured to store different feedback data, and a first relationship between pressure values and the feedback data; each feedback data corresponds to one pressure value; the controller is configured to determine a feedback data corresponding to the determined pressure value according to the stored first relationship, and generate the control signal according to the determined feedback data, thereby controlling the robot to generate the feedback with the feedback data.

2. The robotic hand of claim 1, wherein the pressure value is proportional to the feedback data.

3. The robotic hand of claim 1, further comprising a vibrator, wherein the feedback generated by the robot is vibration feedback; the feedback data is a vibration data; the vibrator is located in the interior casing and electrically connected to the controller; the controller is configured to determine a vibration data corresponding to the determined pressure value according to the stored first relationship, and generate the control signal according to the determined vibration data; the control signal is able to cause the vibrator to vibrate according to the determined vibration data, thereby allowing the robot to generate the vibration feedback.

4. The robotic hand of claim 3, wherein the vibration data is an amplitude or a frequency of the vibration feedback.

5. The robotic hand of claim 1, further comprising an electrothermal layer, wherein the feedback generated by the robot is temperature feedback; the feedback data is a temperature value; the electrothermal layer is wrapping around an exterior surface of the cladding layer; the controller is configured to determine a temperature value corresponding to the determined pressure value according to the stored first relationship, and generate the control signal according to the determined temperature value; the control signal is configured to control the electrothermal layer to heat to the determined temperature value, thereby allowing the robot to generate the temperature feedback.

6. The robotic hand of claim 5, further comprising a protective layer wrapped around an exterior surface of the electrothermal layer.

7. The robotic hand of claim 1, further comprising an electrothermal layer and a thermometer, wherein the feedback generated by the robot is temperature feedback; the electrothermal layer is wrapping around an exterior surface of the cladding layer; the thermometer is located in the electrothermal layer, and is configured to sense an ambient temperature value of an environment in which the robotic hand is located; the controller is configured to obtain the sensed ambient temperature value from the thermometer, compare the obtained ambient temperature value with a preset value, and generate the control signal when the obtained ambient temperature value is greater than the preset value; the control signal is able to cause the electrothermal layer to heat, thereby allowing the robot to generate the temperature feedback.

8. The robotic hand of claim 1, wherein the interior casing is polyhedral-shaped; the photoelectric sensors are secured to different surface of the interior casing.

9. The robotic hand of claim 1, wherein the photoelectric sensors secured to each surface of the interior casing are arranged in a matrix.

10. The robotic hand of claim 1, further comprising a positioning member, wherein the positioning member is located in the interior casing; wires connecting the photoelectric sensors and the controller pass through different locations of the positioning member.

11. A robot comprising:
    a body; and
    two robotic hands secured to two opposite sides of the body, each robotic hand comprising:
        an interior casing;
        a cladding layer wrapped around an exterior surface of an end of the interior casing, the cladding layer made of elastic resin;
        a plurality of photoelectric sensors located at different locations on the exterior surface of the interior casing, the plurality of photoelectric sensors wrapped by the cladding layer and configured to sense light signals striking the different locations on the exterior surface of the interior casing, and convert the sensed optical signals into electrical signals; and
        a controller located inside the interior casing and electrically connected to each on of the plurality of photoelectric sensors, the controller configured to obtain the generated electrical signals, determine a pressure value of pressure applied according to the obtained electric signals, and generate a control signal according to the determined pressure value, the control signal causing the robot to generate feedback;
        wherein the robotic hand further comprises a first memory for storing different feedback data, and a first relationship between pressure values and the feedback data; each feedback data corresponds to one pressure value; the controller is configured to determine a feedback data corresponding to the determined pressure value according to the stored first relationship, and generate the control signal according to the determined feedback data, thereby controlling the robot to generate the feedback with the feedback data.

12. The robot of claim 11, wherein the feedback generated by the robot is vibration feedback; the feedback data is a vibration data; the robotic hand further comprises a vibrator located in the interior casing and electrically connected to the controller; the controller is configured to determine a vibration data corresponding to the determined pressure value according to the stored first relationship, and generate the control signal according to the determined vibration data; the control signal is able to cause the vibrator to vibrate according to the determined vibration data, thereby allowing the robot to generate the vibration feedback.

13. The robot of claim 11, wherein the feedback generated by the robot is temperature feedback; the feedback data is a temperature value; the robotic hand further comprises an electrothermal layer wrapping around an exterior surface of the cladding layer; the controller is configured to determine a temperature value corresponding to the determined pressure value according to the stored first relationship, and generate the control signal according to the determined temperature value; the control signal is able to cause the electrothermal layer to heat to the determined temperature value, thereby allowing the robot to generate the temperature feedback.

14. The robot of claim 11, further comprising a display screen, a second memory, and a processor, wherein the feedback generated by the robot is based on emotion displayed in pictures; the display screen is secured to a front surface of the body; the second memory and the processor are located in the body; the second memory is configured to store a plurality of pictures having associated emotional classifications, and a second relationship between the pressure values and the pictures; each picture corresponds to one pressure value; the processor is electrically connected to the controller, and is configured to obtain the pressure value from the controller, determine a picture corresponding to the obtained pressure value according to the stored second relationship, and control the display screen to display the determined picture, thereby allowing the robot to generate the feedback based on emotion displayed in pictures.

15. The robot of claim 11, wherein the robotic hand further includes a multiplexer located in the interior casing; the controller is electrically connected to the photoelectric sensors via the multiplexer; the multiplexer is configured to obtain the electrical signals from at least one photoelectric sensor via a corresponding sub-channel; the controller is configured to obtain the electrical signals from the multiplexer, and generate the control signal according to the obtained electrical signals.

16. A method for making a robotic hand comprising:

providing an interior casing, a number of photoelectric sensors being located at different locations on the exterior surface of the interior casing, a controller being located inside the interior casing and electrically connected to each of the photoelectric sensors, the plurality of photoelectric sensors photoelectric sensors being configured to sense light signals striking the different locations on the exterior surface of the interior casing and convert the sensed optical signals into electrical signals, the controller being configured to obtain the generated electrical signals, determine a pressure value of pressure applied according to the obtained electric signals, and generate a control signal according to the determined pressure value, the control signal causing a robot to generate feedback;

providing a mold including a female mold core and a male mold core, the female mold core and the male mold core cooperatively defining a mold cavity;

loading the interior casing into the mold cavity, the interior casing being spaced from interior surfaces of the mold cavity to define a gap;

filling the gap with a molten elastic resin by injection molding;

solidifying the elastic resin to form a cladding layer on the exterior surface of the interior casing, causing the photoelectric sensors to be wrapped by the cladding layer; and separating the interior casing with the cladding layer from the mold, to obtain the robotic hand.

* * * * *